Feb. 3, 1948.  D. C. BOMBERGER ET AL  2,435,195
DATA SMOOTHING NETWORK
Filed June 20, 1942          2 Sheets-Sheet 1
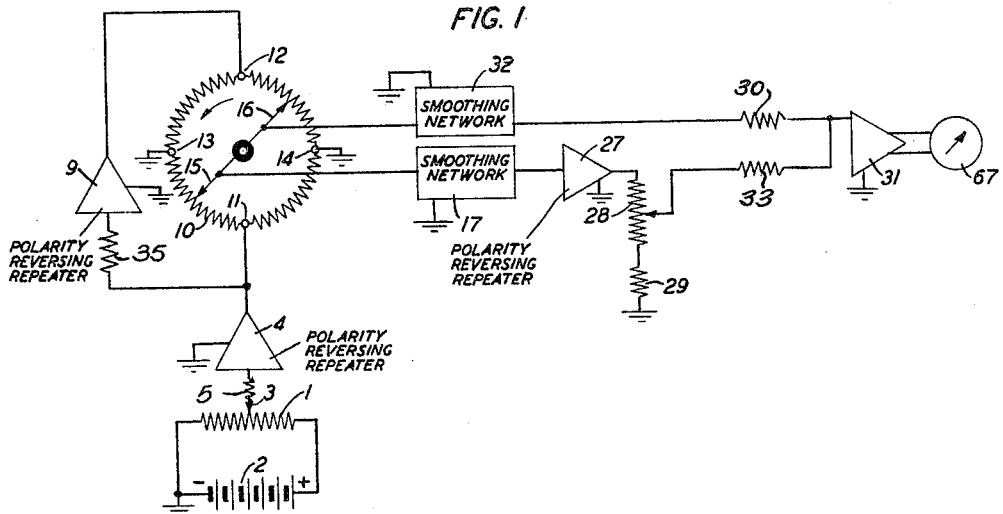
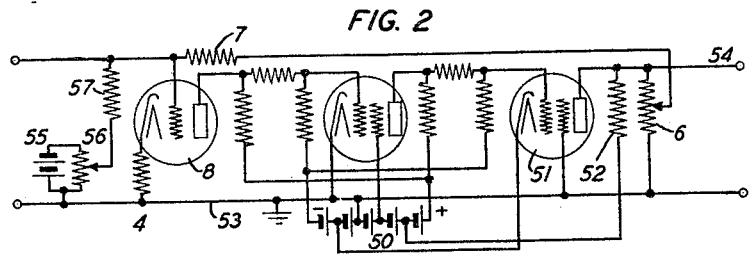
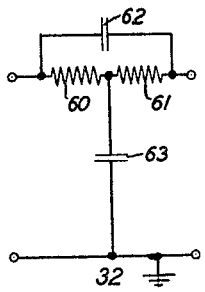
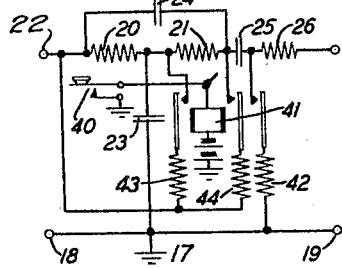
INVENTORS
D. C. BOMBERGER
C. A. LOVELL
H. G. OCH
K. D. SWARTZEL
B. T. WEBER
BY W. R. Dawson
ATTORNEY Feb. 3, 1948.   D. C. BOMBERGER ET AL   2,435,195
DATA SMOOTHING NETWORK
Filed June 20, 1942   2 Sheets-Sheet 2

INVENTORS:
D. C. BOMBERGER
C. A. LOVELL
H. G. OCH
K. D. SWARTZEL
B. T. WEBER

BY W. R. Dawson
ATTORNEY

Patented Feb. 3, 1948

2,435,195

UNITED STATES PATENT OFFICE 2,435,195

DATA SMOOTHING NETWORK

David C. Bomberger, Plainfield, Clarence A. Lovell, Summit, Henry G. Och, West Englewood, N. J., and Karl D. Swartzel, Murray Hill, and Bruce T. Weber, New York, N. Y., assignors to Bell Telephone Laboratories, Incorporated, New York, N. Y., a corporation of New York Application June 20, 1942, Serial No. 447,852

9 Claims. (Cl. 235—61.5)

This invention relates to electrical computing systems, and particularly to systems in which the rate of change of the data is computed.

The object of the invention is to eliminate the effect of minor errors and erratic variations in the electrical quantities representing the data.

A feature of the invention is an electrical network constructed and adapted to smooth out minor variations in an electric current, without materially affecting the accuracy of the data represented by the current.

Another feature of the invention is a relay system adapted, when desired, to prevent the voltages in the network from rising to undesirable values, and, at the same time, to permit the existence of voltages in the network of desired values.

Other features and advantages of the invention will be apparent from the following description and the drawings, in which Fig. 1 schematically shows a computing system embodying the invention;

Fig. 2 shows an electrical repeater forming part of the system of Fig. 1;

Figs. 2A and 2B show alternative input circuits for the repeater of Fig. 2;

In many electrical computing systems, no matter how the data involved in the computation are represented, the measurement of the data is usually made by measuring an electric current. The errors in the representation of the data by the electric current are usually small, but, due to the conditions under which the measurements are made, these errors cause the measured values to vary in an erratic manner around the true value. Also, many of the devices used in making the computation, such as rheostats, potentiometers, etc., cause the data to change in small discrete steps, in place of a uniform variation. In accordance with the present invention, these minor inaccuracies and erratic deviations are smoothed out to average values before completing the computation.

Figure 3:
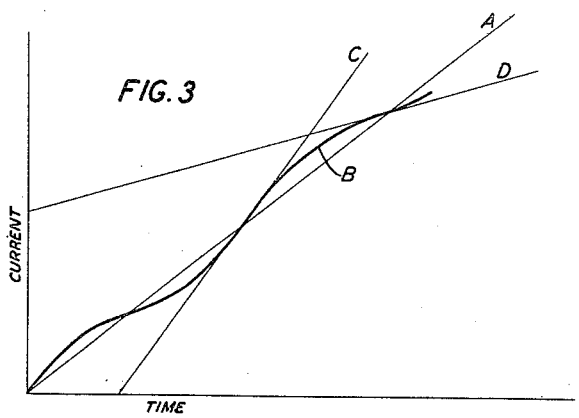
Figs. 3 and 4 are diagrams showing the phenomena involved.

In Fig. 3 let the ordinates represent successive values of the data expressed by the successive amplitudes of an electric current, and the abscissas represent time. Assume that the data actually vary along the line A, but the values of the data as observed vary around the true value as shown by the line B. If the data are to be used for the prediction of some future value or event, as in artillery computers, the rate of change in the data will be multiplied by some factor to give the predicted change in the data. The rate of change in the data is, of course, the slope of the curve between the two selected points from which the rate is determined. In the present case, the correct rate of change is the slope of the line A. But, if the rate of change in the data is determined by the slope of the curve B, an erroneous value, such as the slope of the line C or line D, may be given. This erroneous value of the rate of change in the data may produce very large errors in the prediction. It is therefore necessary to smooth out or average the values of the data given by the curve B. The observers usually tend to overrun and underrun the correct values, so that the deviations have a roughly cyclic form. The time constant of the smoothing network should be longer than one cycle of the deviations shown in the curve B, and preferably should cover several cycles.

Figure 4:
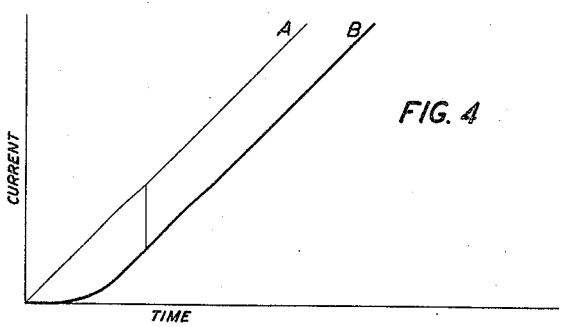

When the network is associated with a device which derives the derivative or time rate of change of the data, the delay in the network usually is not detrimental to the accuracy of the computation. But, when such a network is associated with a device which indicates the absolute values of the data, the delay in the network may be undesirable. In Fig. 4, the line A represents a constantly varying current flowing into a network having an appreciable time constant. The line B represents the current flowing out of the network. The output current starts to flow as soon as the input current flows into the network, but the output current starts at a low value and builds up rather slowly, so that the amplitude of the output current at a given instant is not equal to, or lags behind, the amplitude of the input current. When using a simple network of a few elements the amplitude of the output current differs from, or lags behind, the amplitude of the input current by an amount equal to the derivative, or time rate of change of the input current multiplied by the time constant of the network. The more complicated networks have more than one time constant, though usually one time constant will predominate. In such cases, the output current lags by an amount approximately equal to the derivative of the input current multiplied by the predominant time constant. More accurately, in complicated networks, the output current lags by an amount equal to the derivative of the input current multiplied by the integral from time zero to infinity of unity minus the indicial admittance of the network. In the claims, the expression time constant is to be construed as meaning both the approximate value and the accurate value. The expression indicial admittance is defined on page 14, Electric Circuit Theory, J. R. Carson, published by McGraw-Hill Book Company, New York, 1926.

For the purpose of specific description the invention has been disclosed as embodied in a system for computing a future vertical height from measurements of slant distance, elevation angle and other data, but the invention is not limited to this specific system and is of general application to many electrical computing systems.

In Fig. 1, the potentiometer winding 1, is connected across the source of electrical energy 2. The wiper 3 is moved in proportion to the slant distance to some object, such as an airplane. The slant distance may be measured by any desired means, such as an optical range finder, a sonic or radio distance measuring equipment, or a triangulation from a plurality of stations. The wiper 3 may be manually moved to agree with the determinations of slant distance, or may be automatically moved by known telemetric devices such, for example, as shown in British Patent 164,765, P. W. Williams.

The voltage selected by the wiper 3 is applied through the resistor 5 to the input of a polarity reversing repeater 4, which may be of the type shown in Fig. 2. The polarity reversing repeater shown in Fig. 2, is disclosed in United States Patent 2,401,779, patented June 11, 1946, by K. D. Swartzel, Jr., a joint inventor of the present invention, and is assigned to the assignee of the present invention.

The polarity reversing repeater shown in Fig. 2 comprises a thermionic amplifier having an odd number of stages. As the voltages applied to the repeater may vary rather slowly, or may have zero variation, the interstage coupling networks may be of the type disclosed in United States Patent 1,751,527, March 25, 1930, to H. Nyquist. Energy of negative or reverse phase is fed back from the output circuit, if desired, from a potentiometer 6 connected across the output circuit. Any other desired method of feed back may be used. The energy is fed back through a resistor 7 to the control electrode of the first vacuum tube 8. The reverse feedback is large enough to reduce the effective input impedance of the repeater to a small value, and to make the gain of the repeater substantially wholly dependent upon the feedback path. The repeater of Fig. 2 with suitable input resistance will thus repeat the input voltage without change of magnitude, but, due to the odd number of stages, will reverse the polarity.

As the voltage selected by the wiper 3 is proportional to $+r$, the slant distance, the voltage from the output of repeater 4 will be proportional to $-r$. This voltage is applied directly to a central point 11 of the winding 10 of a potentiometer.

The voltage $-r$ from the output of the repeater 4 is also applied through resistor 35 to a second polarity reversing repeater 9. The voltage $+r$ from the output of the repeater 9 is applied directly to a point 12 of the winding 10 diametrically opposite to the point 11 of application of the voltage from the repeater 4. The intermediate points 13 and 14 of the winding 10 are grounded.

Figure 5:
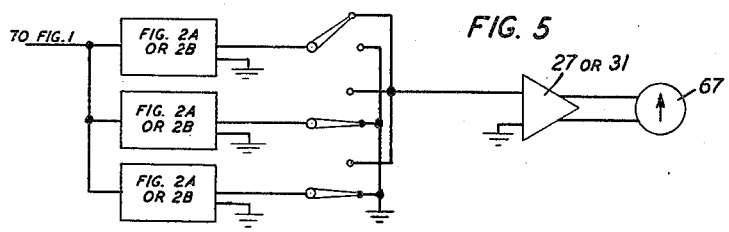
Figs. 5 and 6 show diagrams for switching networks without disturbing the accuracy of the computations.
Figure 6:
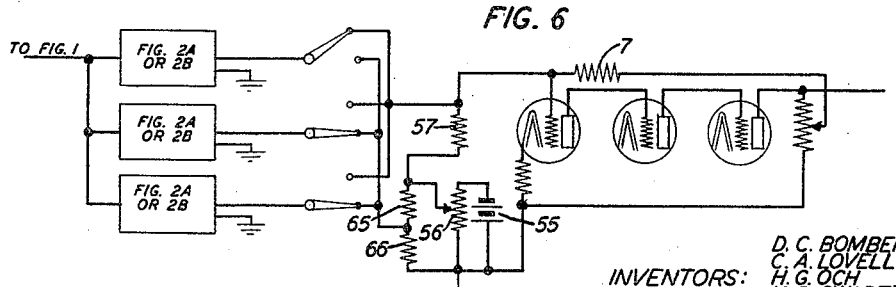

For convenience of disclosure, single line circuits have been shown in Figs. 1, 5 and 6 but it will be understood that the return circuits are through a common ground and the magnitude and polarity of the voltages are expressed with respect to ground.

The wipers 15 and 16 are insulated from each other, driven by common means in the same direction and respectively make contact with the winding 10. The wipers 15 and 16, are moved in known manner by, or in accordance with, some known sighting means, such as a telescope, sight rod, radio location device or other device, through the elevation angle of some object, such as an airplane.

The resistance of the winding 10 varies with the sinusoidal function of an angle having the value zero at point 14, 90 degrees at point 12, 180 degrees at point 13 and 270 degrees at point 11. Considering the wiper 16 rotating counter-clockwise from the point 14, the voltage selected by the wiper 16 will vary with the sinusoidal function of the angle of rotation, that is, positive and increasing from point 14 to point 12, positive and decreasing from point 12 to point 13, negative and increasing from point 13 to point 11, negative and decreasing from point 11 to point 14. The voltage of the wiper 16, with respect to ground will thus vary with $r$ times the sine of the angle of elevation, that is, the vertical height of the object. The wiper 15 is displaced 180 degrees with respect to the wiper 16. Thus, the voltage of the wiper 15 with respect to ground will be minus $r$ times the sine of the angle of elevation.

The operator of the sighting device which moves the wipers 15, 16 will frequently tend to overrun and underrun the object, thus, although the average value of the data may be accurate, there will be erratic variations in the data as obtained. Also, the winding 10 is conveniently formed by winding resistance wire on a card cut to shape and formed into an arc after winding. As the wipers 15, 16 are rotated, they pass over the individual turns of the wire and thus cause a variation which is in small steps, instead of a truly continuous variation.

In many problems, not only is the absolute value of the data required, but also the rate of change in the data. For example, in directing anti-aircraft fire, the future position of the target may be predicted by obtaining the absolute values of the rectangular coordinates of the present position of the target, and adding to these values the increments in the coordinates, which are equal to the rate of change in the coordinates multiplied by the time of flight of the shell.

To obtain an accurate value for the rate of change of a coordinate, such as the coordinate of vertical height represented by the voltage on the wiper 15, this voltage is applied to the network 17, which may be of the type shown in Fig. 2B.

The network shown in Fig. 2B is a four-terminal network having one input terminal 18 directly connected to one output terminal 19 and preferably connected to ground. Terminals 18 and 19 are connected to the ground connection indicated in Fig. 1 of the network 17, while terminal 22 is connected to brush 15, Fig. 1. From the end of resistor 26 remote from the condenser 25, Fig. 2B, connection is made to the input terminal remote from ground of repeater 27, Fig. 1. Two resistors 20 and 21 are connected in serial relationship to the other input terminal 22. A capacitor 23 is connected from the junction of the resistors 20, 21 to the ground. A second capacitor 24 is connected in parallel relationship with the resistors 20, 21. As discussed hereinafter, the values of the resistors 20, 21 and the capacitors 23, 24 are chosen with regard to the anticipated irregularities, to produce a smoothed voltage across the output of the network.

In order to obtain the rate of change of the voltage applied to the input of the network shown in Fig. 2, a capacitor 25, is connected in series with the output of the network as shown in Fig. 2B. The output terminals of the network are connected to a repeater 27, of the type shown in Fig. 2. If desired a resistor 26 may be connected in serial relationship with the capacitor 25 to increase the smoothing effect of the network.

The serially connected capacitor 25 in the input of the repeater 27 will cause the output voltage of the repeater 27 to vary in accordance with the time rate of change of the voltage applied to the network 17. Condenser 25 coacting with resistors 56 and 57 of repeater 27 shown in Fig. 2 effect this time differentiation of the smoothed voltage, providing across resistors 56 and 57 in series a time derivative voltage as taught in United States Patent 2,251,973, August 12, 1941, to E. S. L. Beale et al.

The output voltage of the repeater 27, which is proportional to the rate of change of the voltage representing the vertical height of the present position of the object, is applied to the winding of a potentiometer 28. The wiper of the potentiometer 28 is moved, by means not shown, proportionally to the time of flight of the shell from the gun to the predicted position of the target, or any other time interval appropriate to the data being computed. The voltage selected by the wiper of the potentiometer 28 will thus be equal to the predicted increment in the data selected by the wiper 16.

The voltage from the wiper 16, proportional to the absolute value of the height of the target, and the voltage from the wiper of the potentiometer 28 proportional to the predicted increment in the height are respectively connected to the resistors 30 and 33, which are connected to a repeater 31 of the type shown in Fig. 2. If the resistances of the resistors 30 and 33 are of the proper relative value, the output of the repeater 31 will be a voltage proportional to the predicted value of the height, which may be indicated on meter 67 or supplied to another computing circuit.

In many observational systems, such as antiaircraft observation systems, it is necessary to slue, or shift rapidly from one object of observation, or target, to another object or target. During such a slue, a very high rate of change in the data may be produced, and such a high rate of change will tend to overload the computing elements. A switch or key 40 may be located at some convenient point near the observing device. Before commencing to slue the observing device, the key 40 is operated, and held operated during the slue. The operation of key 40 operates relay 41. The operation of relay 41 connects resistor 42 across the input terminals of the repeater 27 and prevents any unduly high voltages from being transmitted to the network.

In order to secure the desired smoothing effect, the resistances of the resistors 20, 21 are frequently quite large, and the capacitances of the capacitors 23, 24, 25 are also quite large. The capacitors 23, 24, 25 thus tend to be charged and discharged rather slowly. During a rapid slue, the charges due to the prior observations may not be discharged rapidly enough, or, after the slue, the charges due to the present observations may not be acquired rapidly enough. To reduce this effect, the operation of relay 41 short circuits the resistors 20, 21, either directly, or through spark reducing resistors 43, 44. The resistances of the resistors 43, 44 are low compared to the resistances of the resistors 20, 21, and permit the capacitors 23, 24, 25 to be rapidly discharged and recharged to the proper value.

The time constant of the network shown in Fig. 2B may be selected to correct for characteristic irregularities in the data. For example, an observer may regularly overrun and underrun the target in a characteristic cycle having an average period of about 5 seconds, while another observer might have a cycle having a period of 10 or 20 seconds. The corresponding time constants of the networks would be 1, 2 and 4. In a practical embodiment of the invention, for a 5-second network, the capacitors 23, 24, 25, respectively, may have capacities of 4.3, 1.02 and 1 microfarad, and the resistors 20, 21, 26 may all have resistances of 0.16 megohm each. For a 20-second network, the capacitors 23, 24, 25 may respectively have capacities of 1.4, .04 and 1 microfarad, and the resistors 20, 21, 26 may respectively have resistances of 1.25, 1.25 and .64 megohms. The resistors 42, 43, 44 may have resistances of the order of say 10,000 ohms.

Networks having time constants of say 1, 2 and 4 are provided with the computing device, and the network best adapted to correct for the characteristic inaccuracies of the particular observer is used whenever that observer is making the observations.

The repeater of Fig. 2 is energized by a source of voltage 50, having a negative tap connected to the cathode of the vacuum tube 51, a positive tap connected through the coupling resistor 52 to the anode of the vacuum tube 51 and an intermediate tap connected to the conductor 53, which may be grounded. The intermediate tap of the source 50 is so selected that, in the absence of a signal voltage, the resistances of resistor 52 and the anode-cathode path of vacuum tube 51 form with the sections of the source 50 a balanced bridge, thus terminal 54 is at ground potential. If this result is not exactly attained, a small voltage from the source 55 may be selected by the wiper of potentiometer 56 and applied through resistor 57 to the input of the repeater. By adjusting the wiper of potentiometer 56, the voltage between terminal 54 and ground may be made exactly zero. Assume that a voltage, positive with respect to ground, is applied, say through resistor 30, to the control grid of vacuum tube 8. An amplified positive voltage will be applied to the control grid of vacuum tube 51, changing the anode-cathode resistance of vacuum tube 51, unbalancing the bridge and making terminal 54 negative with respect to ground. Current will flow from the source through resistors 30, 7 and the anode-cathode path of vacuum tube 51 back to the source. The current will assume a value such that substantially all the applied voltage is used to drive the current through resistor 30 and the potential of the control grid of vacuum tube 8 is reduced nearly to zero. The potential of terminal 54 will assume a value equal to the voltage drop in resistor 7, making the effective voltage gain for this input equal to the ratio of the resistances of resistors 7 and 30. If a second voltage be applied, say through resistor 33 to the input of the amplifier, a current will flow in resistors 33 and 7 of such value that substantially all the applied voltage is used to drive the current through resistor 33. The potential of terminal 54 will assume a value equal to the voltage drop in resistor 7 due to the algebraic sum of the currents in resistor 7. The output voltage of the repeater will thus be proportional to the algebraic sum of the applied voltages. As the current flowing through a series capacitor is proportional to the time rate of change of the applied voltage, when a voltage is applied to the input of the repeater through a series capacitor, such as capacitor 25, Fig. 2B, the current flowing in resistor 7, and the output voltage of the repeater, will be proportional to the time rate of change of the applied voltage.

If desired, the voltage from the wiper 16 may be smoothed by a network 32, which may be of the type shown in Fig. 2A. The network shown in Fig. 2A is of the type of network shown in Fig. 2B with the relay 41 omitted and includes two serially connected resistors 60, 61, shunted by a capacitor 62, and a shunt capacitor 63. While one specific type of network is disclosed, it is evident that other types of networks may be used. The computing elements in the system such as the meter 67, or a computing system which replaces the meter 67 will normally be adapted to operate on any value of the data from minimum to maximum, thus the changes in the data during a slue will not usually overload these elements. Thus, a relay of the type shown in Fig. 2B is usually not required in connection with a network smoothing the values of the data, though such a relay may be used if desired. The output of the network 32 is connected through resistor 30, to the summing repeater 31. As discussed in connection with Fig. 4, the output of the network 32 will lag behind the input to the network an amount proportional to the rate of change of the applied voltage. The voltage selected by the wiper 15 is at all times equal to the voltage applied by wiper 16 to the network 32, and the output of the network 17 and repeater 27 is equal to the rate of change in the applied voltage. Thus, the voltage drop across a suitable resistor 29 in the output circuit of the repeater 27 will be proportional to the rate of change of the voltage from the network 32 applied to the repeater 31, and this voltage drop across the resistor 29 is also supplied to the repeater 31 to correct the output of repeater 31 for the effect of the delay in network 17. When the resistor 29 is inserted in the circuit, the voltage gain of the repeater 27 must be increased until the voltage drop across the winding of the potentiometer 28 is again equal to the original value. The resistor 29 should have a resistance equal to the resistance of the winding of potentiometer 28 multiplied by the time constant of the network divided by the maximum value of the data, in the present case, the maximum value of the time of flight. For example, assume the maximum time of flight is 30 seconds, and assume the time constant of network 32 is 2 seconds. The gain of repeater 27 is increased to $$\frac{30+2}{30}$$

of its original value, and the resistance of resistor 29 is 2/30 of the resistance of the winding of potentiometer 28.

As discussed hereinabove, several networks may be provided, to correct for observers of different skills, or an observer whose skill is decreasing due to fatigue. Preferably, all of these networks should be connected to the source of voltage representing the data so that each network will be immediately available, without waiting for the elements of the network to be raised to the proper potential, and the networks should be switched into the circuit without materially affecting the data being supplied. The input circuits of the repeaters 17 and 32 are nearly at ground potential, thus, as shown in Fig. 5, all the networks may be connected in parallel to the source, the output circuits being connected to single pole, double throw switches. The output of the network per Fig. 2A or 2B in use is switched to the repeater 27 or 31, the outputs of the other networks being switched to ground. All of the networks are thus subjected to substantially similar voltages, and one network may be switched out and another network switched in without materially disturbing the output of the repeater 27 or 31.

As explained in connection with Fig. 2, in order to correctly balance the repeater, it is often necessary to supply a small zero correcting voltage from the potentiometer 56. In such case, the input circuit of the repeater is not exactly at ground potential, and switching the networks by the system shown in Fig. 5 may momentarily decrease the accuracy of the data transmitted. In a repeater of this type, it may be shown that the output voltage is equal to the applied voltage times the ratio between the resistance of the feedback resistor 7 and the resistance of the resistor 57 in series with the applied voltage. As shown in Fig. 6, two resistors 65, 66 may be connected in serial relationship from the wiper of potentiometer 56 to ground. The ratio of the resistances of the resistors 65, 66 is the same as the ratio of the resistances of the resistors 57, 7. The output circuits of the networks not in use are connected through switches to the junction of resistors 65 and 66 and will thus be maintained at the proper potential with respect to ground, so that when switched to the repeater accuracy of the data transmitted will not be affected.

What is claimed is:

1. In a system for computing the predicted value of a natural phenomenon, a source of voltage, means for varying the voltage from said source in accordance with the present changes in said phenomenon, a first electrical network associated with said voltage varying means for smoothing said varying voltage and having a time constant producing a time delay between the input and the output voltages of said first network, a second electrical network associated with said voltage varying means for smoothing said varying voltage and having a time constant larger than the period of the random variations in said voltage and including means for differentiating with respect to time said smoothed voltage, an electrical device controlled by said differentiated voltage for producing an output current varying proportionally to said differentiated voltage, a third electrical network for deriving from said output current a voltage proportional to the sum of the predicted change in said phenomenon and the time delay in said first network and means for adding said derived voltage to the output voltage of said first network.

2. In a computing system, a source of a first voltage varying in accordance with the observed values of a natural phenomenon, an electrical smoothing network connected to said source to purify said varying voltage of undesired perturbations due to spurious variations in said observed values, an electrical device controlled by said network to produce a voltage varying with the time rate of change of said purified voltage, fractionating means associated with said device to select a second voltage proportional to the smoothed increment in said first voltage during a desired time interval and electrical means connected to said source and to said fractionating means to combine said second and said first voltages, thereby producing a third voltage proportional to the predicted value of said phenomenon at the end of said time interval.

3. In an artillery director, a source of a first voltage varying with a coordinate of the observed position of a target, a first electrical network connected to said source to produce a smoothed average of said first voltage, a second electrical network connected to said source to produce a second voltage varying with a smoothed average of the time rate of change of said first voltage substantially free of undesired perturbations due to observational and other spurious variations, means connected to said second network for selecting a fraction of said second voltage proportional to the change in said first voltage during a definite time interval, and electrical means connected to said first network and said fractionating means to produce a voltage proportional to the predicted value of said coordinate at the end of said time interval.

4. In a computing system, a source of voltage, means for varying the voltage from said source in accordance with the observed changes in a natural phenomenon and means for obtaining the smoothed time rate of change of said varying voltage including an electrical network having two input and two output terminals, one of said input and one of said output terminals being connected together to ground, two resistors in series connected to the other input terminal, a capacitor connected in parallel with said resistors, a second capacitor and a third resistor in serial relationship connected from the free end of said two resistors to the other output terminal and a third capacitor connected from the junction of said two resistors to ground.

5. In a computing system, apparatus as in claim 4 including relay means operable to connect fourth and fifth resistors respectively in parallel relationship with said two resistors and with said first capacitor and a sixth resistor from the junction of said second capacitor and said third resistor to ground.

6. In combination, a source of unidirectional, varying voltage, a load, a first circuit connecting said source and said load including series impedances and shunt reactances connected to form a plurality of meshes having different time constants, and a second circuit connecting said source and said load including a series capacitor, said capacitor having a capacitance proportioned to supply to said load a current varying in amplitude proportionally to the time rate of change of the voltage from said source multiplied by the integral from time zero to infinity of unity minus the indicial admittance of said first circuit.

7. In combination, a high gain amplifier having grounded input and output circuits, a first resistor connecting said input and output circuits, a grounded source of biasing potential, a second resistor connecting said source to said input circuit, a load connected to said output circuit, third and fourth resistors connected in serial relationship across said source, the ratio of the resistances of said third and fourth resistances being equal to the ratio of the resistances of said first and second resistors, a plurality of double throw switches, each having a contact connected to said input circuit, a second contact connected to the junction of said third and fourth resistors and a blade, a plurality of networks including resistive and capacitive elements, said networks each having an output terminal respectively connected to one of the switch blades, a common grounded input and output terminal and a free input terminal, and a source of signal voltage connected to all said free input terminals.

8. The combination in claim 7 in which the networks each include fifth and sixth resistors connected in serial relationship from the free input terminal to the output terminal, a first capacitor conneced across both said resistors, and a second capacior connected from the junction of said fifth and sixth resistors to ground.

9. In a system for computing the predicted value of a natural phenomenon after the lapse of a desired time interval, a source of voltage, means connected to said source and controlled in accordance with observations of said phenomenon to form the source of a voltage varying in amplitude proportionally to said phenomenon, a summing device, a first network having a known time constant connected from said means to said device, a high gain amplifier having input and output circuits, a second network connected from said means to said input circuit and including a series capacitor, a first potentiometer having a winding connected across said output circuit and a first brush, a first resistor connected from said brush to said input circuit, the product of the capacitance of said capacitor, the resistance of said resistor and the reciprocal of the potential dividing ratio of said potentiometer being initially equal to the maximum value of said time interval, a second resistor, a second potentiometer having a winding connected in serial relationship with said second resistor across said output circuit and a second brush connected to said summing device and adjusted to select a voltage proportional to said desired time interval, the ratio of the resistances of the winding of said second potentiometer and second resistor being equal to the ratio of the maximum value of said time interval and said time constant, the brush of said first potentiometer being finally adjusted to make said product equal to the sum of the maximum value of the time interval and the time constant.

DAVID C. BOMBERGER.
CLARENCE A. LOVELL.
HENRY G. OCH.
KARL D. SWARTZEL.
BRUCE T. WEBER.

REFERENCES CITED

The following references are of record in the file of this patent:

UNITED STATES PATENTS

| Number | Name | Date |
|---|---|---|
| 1,345,702 | Routin | July 6, 1920 |
| 1,345,703 | Routin | July 6, 1920 |
| 1,927,689 | Miessner | Sept. 19, 1933 |
| 1,978,098 | Alexander | Oct. 23, 1934 |
| 2,054,883 | Schlesinger | Sept. 22, 1936 |
| 1,322,153 | Wilson et al. | Nov. 18, 1919 |
| 2,222,172 | Dimmick | Nov. 19, 1940 |
| 2,251,973 | Beale et al. | Aug. 12, 1941 |
| 2,275,747 | Fearon | Mar. 10, 1942 |
| 2,188,611 | Norton | Jan. 30, 1940 |
| 2,324,797 | Norton | July 20, 1943 |
| 1,311,283 | Mathes | July 29, 1919 |
| 2,088,654 | Hull | Aug. 3, 1937 |
| 2,093,665 | Tellegen | Sept. 21, 1937 |
| 2,233,415 | Hull | Mar. 4, 1941 |

FOREIGN PATENTS

| Number | Country | Date |
|---|---|---|
| 167,191 | Great Britain | May 21, 1919 |